United States Patent
Qiu

(10) Patent No.: US 10,085,483 B2
(45) Date of Patent: Oct. 2, 2018

(54) METHOD FOR CONTROLLING ELECTRONIC CIGARETTE WITH MULTIPLE OUTPUT MODES

(71) Applicant: Joyetech (Changzhou) Electronics Co., Ltd., Changzhou (CN)

(72) Inventor: Wei-Hua Qiu, ChangZhou (CN)

(73) Assignee: Joyetech (Changzhou) Electronics Co., Ltd., Changzhou (CN)

( * ) Notice: Subject to any disclaimer, the term of this patent is extended or adjusted under 35 U.S.C. 154(b) by 275 days.

(21) Appl. No.: 14/977,668

(22) Filed: Dec. 22, 2015

(65) Prior Publication Data

US 2016/0106156 A1   Apr. 21, 2016

Related U.S. Application Data

(63) Continuation of application No. PCT/CN2015/081478, filed on Jun. 15, 2015.

(30) Foreign Application Priority Data

Jun. 19, 2014 (CN) .......................... 2014 1 0277706

(51) Int. Cl.
*A61H 33/12* (2006.01)
*A24F 47/00* (2006.01)
(Continued)

(52) U.S. Cl.
CPC .......... *A24F 47/008* (2013.01); *H02J 7/0047* (2013.01); *H02J 7/0052* (2013.01); *H02J 7/0063* (2013.01); *H05B 1/0244* (2013.01); *H02J 2007/0062* (2013.01); *H02J 2007/0067* (2013.01)

(58) Field of Classification Search
None
See application file for complete search history.

(56) References Cited

U.S. PATENT DOCUMENTS 9,861,772 B2 *  1/2018  Terry .................... A61M 15/06
2014/0041655 A1 *  2/2014  Barron ................. A61M 11/042
                                                            128/202.21
(Continued)

FOREIGN PATENT DOCUMENTS

CN          102940313 A       2/2013
CN          103107376 A       5/2013
(Continued)

*Primary Examiner* — Thor Campbell
(74) *Attorney, Agent, or Firm* — ScienBiziP, P.C.

(57) ABSTRACT

A method for controlling an electronic cigarette with multiple output modes includes following steps. Whether button signals are input for a first preset number of times is determined when a system is powered on. The system is controlled to enter a locked state if the button signals are input for the first preset number of times. Whether a switch signal for switching between the output modes is input via a button under the locked state is determined, the output modes comprising a voltage output mode and a power output mode. A current output mode is switched to a new output mode and the new output mode is stored in the memory if the switch signal is input, and outputs are controlled according to the stored output mode after a user unlocks the system and the first controller receives a smoking signal.

13 Claims, 3 Drawing Sheets

(51) Int. Cl.
    *H02J 7/00*     (2006.01)
    *H05B 1/02*     (2006.01)

(56) References Cited

U.S. PATENT DOCUMENTS

| | | |
|---|---|---|
| 2015/0173124 A1 | 6/2015 | Qiu |
| 2015/0257447 A1* | 9/2015 | Sullivan ............... A24F 47/008 131/329 |
| 2017/0143043 A1* | 5/2017 | Liu ....................... A24F 47/008 |
| 2018/0013175 A1* | 1/2018 | Liu ..................... H01M 10/425 |

FOREIGN PATENT DOCUMENTS

| | | |
|---|---|---|
| CN | 0203058292 U | 7/2013 |
| CN | 103783675 A | 5/2014 |

* cited by examiner

METHOD FOR CONTROLLING ELECTRONIC CIGARETTE WITH MULTIPLE OUTPUT MODES

CROSS-REFERENCE TO RELATED APPLICATIONS

This application claims all benefits accruing under 35 U.S.C. § 119 from China Patent Application No. 201410277706.2, filed on Jun. 19, 2014 in the China Intellectual Property Office, the content of which is hereby incorporated by reference. This application is a continuation under 35 U.S.C. § 120 of international patent application PCT/CN2015/081478 filed Jun. 15, 2015.

FIELD

The present disclosure relates to a method and a system for controlling an electronic cigarette with multiple output modes.

BACKGROUND

Output voltages of electronic cigarettes are often constant (for example, 3.3 volts). When an electronic cigarette is working under a constant voltage output mode, in the condition that the load to which the output voltage is provided remains unchanged, the greater the output voltage of the electronic cigarette, the more heat the coil generates, and the hotter the vapor flow during smoking, thereby bringing a different experience to a user. By comparison, the lower the output voltage of the electronic cigarette, the less the amount of airflow generated during smoking, thus failing to improve the user experience. In addition, the resistance of the coil is not detected under the constant voltage output mode. If the resistance of the coil is low but the output voltage is high, a dry-burn effect will occur in the coil. If the resistance of the coil is high but the output voltage is low, the amount of vapor flow generated during smoking is decreased.

SUMMARY

What is needed, is a method and a system for controlling an electronic cigarette with multiple output modes. The user can select a desired voltage output mode or a power output mode to satisfy the need during smoking.

A method for controlling an electronic cigarette with multiple output modes comprises: a first controller determines whether button signals are input for a first preset number of times via a button when a system of the electronic cigarette is powered on. The system is controlled to enter a locked state if the button signals are input for the first preset number of times. The first controller determines whether a switch signal for switching between the output modes is input to the first controller via the button under the locked state, the output modes comprising a voltage output mode and a power output mode which can be stored in a memory of the first controller. A current output mode is switched to a new output mode and the new output mode is stored in the memory by the first controller if the switch signal is input, and outputs are controlled by the first controller according to the stored output mode after a user unlocks the system and the first controller receives a smoking signal.

The method further comprises: the first controller detects and determines whether button signals are input for a second preset number of times if the switch signal is not input; and unlocking the system when the system is in the locked state if the button signals are input for the second preset number of times, and whether the switch signal for switching between the output modes is input if the button signals are not input for the second preset number of times.

The first controller determines that the button inputs the switch signal when the button is pressed for a time period greater than or equal to a first preset time period.

Each of the voltage output mode and the power output mode corresponds to one LED; when the output mode has been switched, the first controller controls one of the two LEDs to emit light to indicate a current output mode.

Each of the voltage output mode and the power output mode further corresponds to one symbolic identifier configured to indicate the current output mode.

The method further comprises: the first controller detects and determines whether a smoking signal is input via the button if the button signals are not input for the first preset number of times. The first controller generates a control signal according to a detection signal from a second controller if the smoking signal is input.

The first controller determines that the smoking signal is input when the user presses the button once.

The detection signal from the second controller comprises a voltage adjusting signal manually input by the user, after the first controller receives the voltage adjusting signal from the second controller, the first controller controls outputs according to the voltage preset by the user.

The detection signal from the second controller comprises a voltage sample signal for sampling a voltage of the battery; the second controller transforms the voltage sample signal to an actual battery voltage, and transmits the actual battery voltage to the first controller; the first controller determines whether the actual battery voltage is high enough to heat a coil which is configured to heat the liquid solution.

If the first controller determines that the actual battery voltage is high enough to heat the coil, the first controller controls the LED corresponding to the current output mode to emit light with a breathing frequency to indicate a current power of the battery.

The method further comprises: the second controller detects whether the coil configured to heat the liquid solution breaks down, and the first controller stops outputting if the coil breaks down.

The method further comprises: the first controller determines whether a time period for pressing the button is greater than a second preset time period during smoking, and the first controller stops outputting if the time period for pressing the button is greater than the second preset time period, and generates a warning signal to warn the user.

The method further comprises: whether a USB connector of the electronic cigarette is connected to a charger after the system is powered on is determined, and the system is controlled to enter a charging state if the USB connector is connected to the charger.

A system for controlling an electronic cigarette with multiple output modes comprising: a button for inputting a switch signal for switching between the output modes; a first controller; and a voltage output module; wherein the button is electrically connected to an input terminal of the first controller, an output terminal of the first controller is electrically connected to the voltage output module, the output modes comprise a voltage output mode and a power output mode, the first controller switches from a current output mode to a new output mode and stores the new output mode in the memory under the locked state, after a user unlocks the system and the first controller receives a smoking signal from the button, the first controller transmits the stored output mode to the voltage output module.

The system further comprising: a second controller; and an output voltage adjusting module; wherein the second controller is electrically connected to the first controller, the output voltage adjusting module is electrically connected to the second controller, the voltage adjusting signal input by the user via the output voltage adjusting module is transmitted to the second controller, the first controller controls outputs according the voltage preset by the user when the first controller receives the voltage adjusting signal from the second controller.

The first controller further determines whether button signals are input for the second preset number of times via the button if the switch signal is not input, and unlocks the system when the system is in the locked state if the button signals are input for the second preset number of times.

The first controller determines that the button inputs the switch signal when the button is pressed for a time period greater than or equal to the first preset time period.

Each of the voltage output mode and the power output mode corresponds to one LED; when the output mode has been switched, the first controller controls one of the two LEDs to emit light to indicate the current output mode.

The first controller further determines whether a smoking signal is input via the button if the button signals are not input for the first preset number of times, and generates a control signal according to a detection signal from a second controller if the smoking signal is input.

The detection signal from the second controller comprises a voltage adjusting signal manually input by the user; after the first controller receives the voltage adjusting signal from the first controller, the first controller controls outputs according to the voltage preset by the user.

With the above configuration, the present disclosure adds the power output mode compared to the conventional electronic cigarette. For the power output mode of the present disclosure, when the user selects a specific output power via the voltage adjusting module, the system first reads the resistance of the coil, and calculates the corresponding output voltage according to a formula relating to power and resistance. Thus, the present disclosure has the following advantage. When the user smokes the electronic cigarette under the power output mode, no matter the resistance of the coil and the output voltage, the user can obtain a satisfied amount of airflow based on a constant output power. As for a constant output power (which is corresponding to the amount of airflow), the system can automatically adjust the output voltage according to the resistance of the coil, thereby preventing a short-circuit effect from being generated in the coil. Therefore, the user can select a desired output mode according to need, and also can select a desired output mode by switching between the output modes during smoking, there increasing the diversity of options. For an electronic cigarette with a simple configuration, the user experience and the quality of the electronic cigarette can be improved.

BRIEF DESCRIPTION OF THE DRAWINGS

Implementations of the present technology will now be described, by way of example only, with reference to the attached figures.

DETAILED DESCRIPTION

Figure 1:
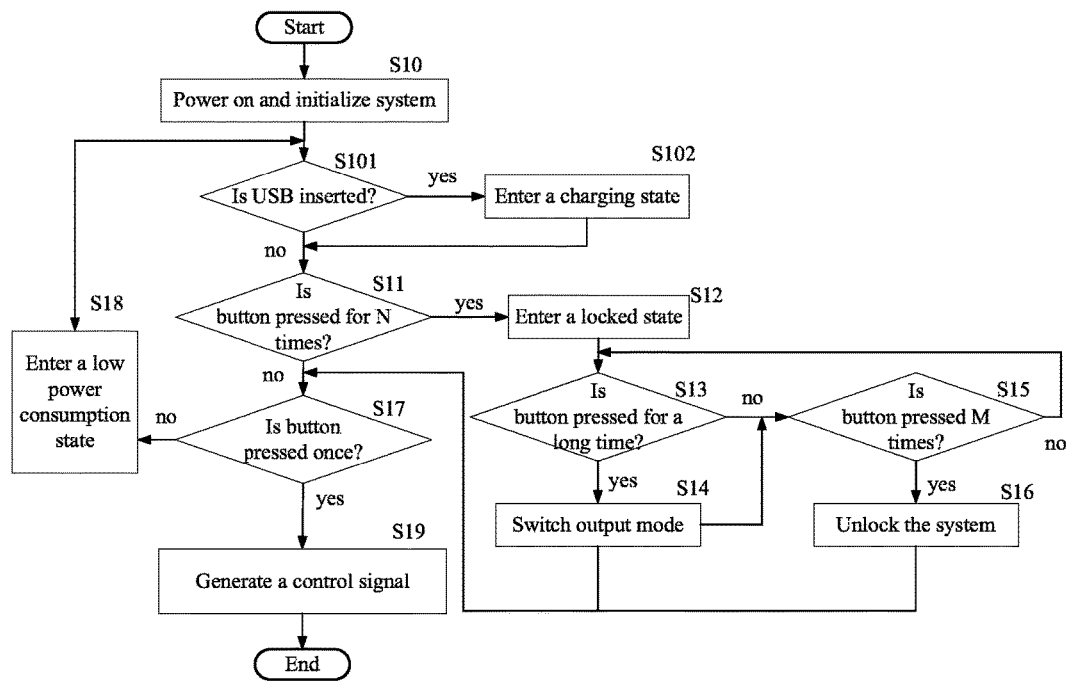
FIG. 1 is a flowchart of an embodiment of a method for controlling an electronic cigarette with multiple output modes.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Furthermore, the word "controller," as used hereinafter, refers to logic embodied in hardware or firmware, or to a collection of software instructions, written in a programming language, such as, for example, Java, C, or assembly. One or more software instructions in the controllers may be embedded in firmware. It will be appreciated that controllers may comprise connected logic units, such as gates and flip-flops, and may comprise programmable units, such as programmable gate arrays or processors. The controllers described herein may be implemented as either software and/or hardware controllers and may be stored in any type of non-transitory computer-readable storage medium or other computer storage device. The term "comprising," when utilized, means "including, but not necessarily limited to"; it specifically indicates open-ended inclusion or membership in the so-described combination, group, series and the like.

Figure 2:
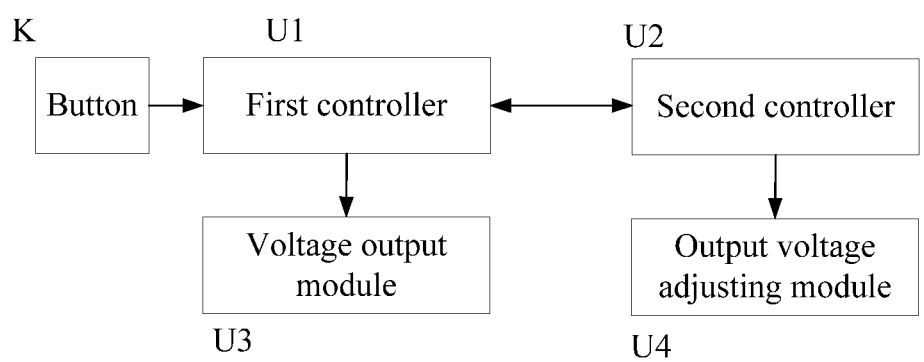
FIG. 2 is a block diagram of an embodiment of a system for controlling an electronic cigarette with multiple output modes.
Figure 3:
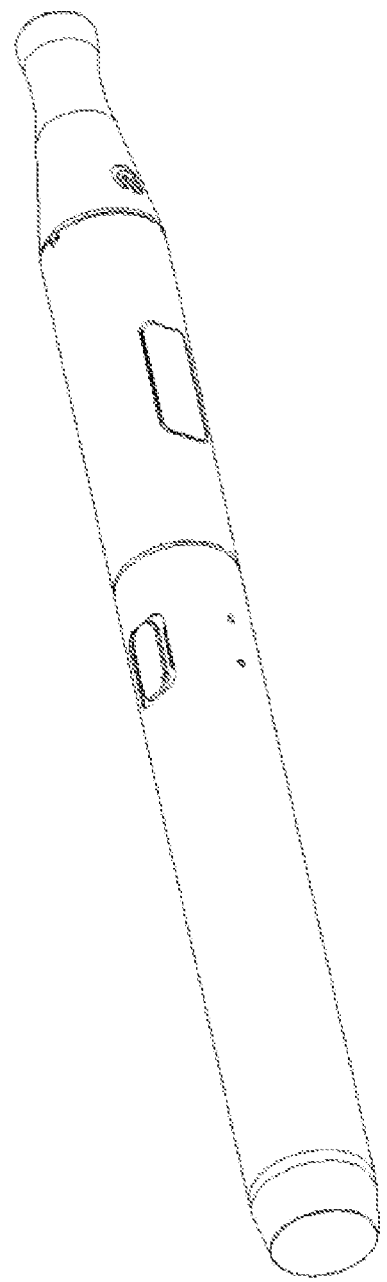
FIG. 3 is an isometric view of an embodiment of an electronic cigarette.

FIGS. 1-2 illustrate a method and a system for controlling an electronic cigarette (shown in FIG. 3) with multiple output modes. The method for controlling the electronic cigarette with multiple output modes comprises following steps.

In step 10, the system is powered on and initialized.

In step 11, a first controller U1 determines whether button signals are input for a first preset number of times (for example, N times, N equals to 5) via a button K when the system is powered on. If yes, the procedure goes to step 12. Otherwise, the procedure goes to step 17.

In step 12, the system enters a locked state. Only when the system is under a locked state, switching between the output modes can be implemented. A user is not allowed to smoke the electronic cigarette when the system is in the locked state, that is, smoking is separated from the output modes to avoid incorrect operations.

In step 13, the first controller U1 determines whether a switch signal for switching between the output modes is input to the first controller U1 via the button K under the locked state. If yes, the procedure goes to step 14. Otherwise, the procedure goes to step 15. The output modes comprise a voltage output mode and a power output mode which can be stored in a memory of the first controller U1. In step 13, the first controller U1 determines that the button K inputs a correct switch signal when the button K is pressed for a time period greater than or equal to a first preset time period (for example, A seconds).

In step 14, the first controller U1 switches from a current output mode to a new output mode and stores the new output mode in the memory. Under the locked state, if the button K is pressed for a time period greater than or equal to the first preset time period, the first controller U1 determines that the button K inputs the switch signal for switching between the output modes. Then, the first controller U1 varies the output mode stored in the memory, that is, the first controller U1 switches from the current output mode to the new output mode. For example, when the system is powered on, the output mode stored in the first controller U1 is the voltage output mode. After the switch signal is input, the first controller U1 varies the stored output mode to the power output mode. After the user unlocks the system and the first controller U1 receives a smoking signal, the first controller U1 controls outputs according to the stored output mode in step 14. The electronic cigarette comprises two light emitting diodes (LEDs). The voltage output mode corresponds to one LED, and the power output mode corresponds to another LED. In step 14, when the output mode has been switched, the first controller U1 controls a corresponding LED to emit light to indicate a current output mode. The electronic cigarette comprises a symbolic identifier "VV" corresponding to the voltage output mode. The symbolic identifier "VV" further corresponds to one LED. If the LED corresponding to the symbolic identifier "VV" emits light, it indicates that the current output mode is the voltage output mode. The electronic cigarette further comprises a symbolic identifier "VW" corresponding to the power output mode. The symbolic identifier "VW" corresponds to another LED. If the LED corresponding to the symbolic identifier "VW" emits light, it indicates that the current output mode is the power output mode. The user can intuitively select a desired output mode according to the indication from the two LEDs. After step 14, the procedure goes to step 15.

In step 15, the first controller U1 detects and determines whether button signals are input for a second preset number of times (for example, M times, M equals to 5) via the button K, that is, the first controller U1 determines whether an unlock signal is input by the user. If no, the procedure goes back to step 13. If yes, the procedure goes to step 16. The second preset number of times may be the same as the first preset number of times, and may also be different from the first preset number of times.

In step 16, the system is unlocked. After the system is unlocked, the user can smoke the electronic cigarette by operating the button K. After step 16, the procedure goes to step 17.

In step 17, the first controller U1 detects and determines whether a smoking signal is input via the button K. That is, the first controller U1 determines whether the user presses the button K once to transmit the smoking signal to the first controller U1 under the unlocked state. If no, the procedure goes to step 18. If yes, the procedure goes to step 19.

In step 18, the system enters a low power consumption state.

In step 19, the first controller U1 generates a control signal to allow the user smoking or not according to a detection signal from a second controller U2. The detection signal from the second controller U2 comprises a voltage adjusting signal manually input by the user. After the first controller U1 receives the voltage adjusting signal from the second controller U2, the first controller U1 controls outputs according to the voltage preset by the user. In at least one embodiment, the memory of the first controller U1 stores two output modes comprising the voltage output mode and the power output mode. The output voltage is constant when the voltage output mode is selected and stored. Only when the user inputs a voltage adjusting signal, the output voltage can be varied according to the voltage preset by the user. For example, a current output voltage is 4V. When the user inputs a voltage adjusting signal of 3.5V, the output voltage varies from 4V to 3.5 V. As for the power output mode, the output power is constant and depends on the output voltage. Thus, when the power output mode is selected and stored, the output power can be varied by adjusting the output voltage. That is, if the user inputs a voltage adjusting signal, the output power can be varied according to the voltage preset by the user. For example, a current output power is 4 W. When the user inputs a power adjusting signal of 3.5 W, the output power changes from 4 W to 3.5 W. The detection signal from the second controller U2 may also comprise a voltage sample signal for sampling a voltage of a battery B. The second controller U2 transforms the voltage sample signal to an actual battery voltage, and transmits the actual battery voltage to the first controller U1. The first controller U1 determines whether the actual battery voltage is high enough to heat a coil which is configured to heat the liquid solution. The battery B is electrically connected to the second controller U2. The second controller U2 is electrically connected to a voltage comparator Q1. The voltage comparator Q1 provides the second controller U2 with a standard voltage. After the second controller U2 detects the battery voltage, the second controller U2 compares the battery voltage with the standard voltage provided by the voltage comparator Q1, and determines the actual battery voltage of the battery B. If the first controller U1 determines that the actual battery voltage is high enough to heat the coil, the first controller U1 controls the LED corresponding to the current output mode to emit light with a breathing frequency to indicate the current power of the battery B, and in this condition the user can smoke. The less the breathing frequency of the LED, the higher the current power of the battery B. Otherwise, the current power of the battery B will be exhausted. When the current battery voltage is less than or equal to 3.3V, the first controller U1 stops outputting.

The method according to the present disclosure is not limited thereto, and can further comprise following steps. In step 101, the first controller U1 further determines whether the USB connector is connected to a charger after the system is powered on. If yes, the procedure goes to step 102; otherwise, the procedure goes to step 11.

In step 102, the system enters a charging state. In addition, the second controller U2 further detects whether the coil configured to heat the liquid solution breaks down. That is, the second controller U2 detects whether the coil is in a short circuit condition, or whether a resistance of the coil is too low. If the coil breaks down, the first controller U1 stops outputting. During smoking, if a time period for pressing the button K is greater than a second preset time period (for example, P seconds, P equals 10), the first controller U1 stops outputting, and further generates a warning signal to warn the user, thereby protecting the coil from being damaged.

The method according to the present disclosure is not limited thereto. The adjustment of the output voltage and the determination of the current battery voltage are performed by the first controller U1 and the second controller U2, respectively. In fact, the above function can also be performed only by the first controller U1, and there is no need to use two controllers.

FIG. 2 illustrates the system S for controlling the electronic cigarette with multiple output modes comprises a button K for inputting a switch signal for switching between the output modes, a first controller U1, and a voltage output module U3. The button K is electrically connected to an input terminal of the first controller U1. An output terminal of the first controller U1 is electrically connected to the voltage output module U3. The output modes comprise a voltage output mode and a power output mode. Under the locked state, the first controller U1 switches from a current output mode to a new output mode and stores the new output mode in the memory. After the user unlocks the system S and the first controller U1 receives a smoking signal from the button K, the first controller U1 transmits the stored output mode to the voltage output module U3. The voltage output module U3 may be a power source for the system S (such as a rechargeable battery or a non-rechargeable battery). The system S further comprises a second controller U2 and an output voltage adjusting module U4. The second controller U2 is electrically connected to the first controller U1. The output voltage adjusting module U4 is electrically connected to the second controller U2. The output voltage adjusting module U4 is an adjustable resistor. The user can adjust the output voltage of the electronic cigarette according to the output voltage adjusting module U4. The voltage adjusting signal input by the user can be processed by the second controller U2. The first controller U1 controls the outputs according the voltage preset by the user when the first controller U1 receives the voltage adjusting signal from the second controller U2.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for controlling an electronic cigarette with multiple output modes comprising:
   determining by a first controller whether button signals are input for a first preset number of times via a button when a system of the electronic cigarette is powered on;
   controlling the system to enter a locked state if the button, signals are input for the first preset number of times;
   determining by the first controller whether a switch signal for switching between the output modes is input to the first controller via the button under the locked state, the output modes comprising a voltage output mode and a power output mode which are able to be stored in a memory of the first controller; and
   switching from a current output mode to a new output mode and storing the new output mode in the memory by the first controller if the switch signal is input, and controlling outputs by the first controller according to the stored output mode after a user unlocks the system and the first controller receives a smoking signal.

2. The method of claim 1, further comprising:
   detecting and determining by the first controller whether button signals are input for a second preset number of times via the button if the switch signal is not input; and
   unlocking the system when the system is in the locked state if the button signals are input for the second preset number of times, and determining whether the switch signal for switching between the output modes is input if the button signals are not input for the second preset number of times.

3. The method of claim 1, wherein the first controller determines that the button inputs the switch signal when the button is pressed for a time period greater than or equal to a first preset time period.

4. The method of claim 1, wherein the voltage output mode corresponds to one LED, and the power output mode corresponds to another LED; when the output mode has been switched, the first controller controls a corresponding LED to emit light to indicate the current output mode.

5. The method of claim 4, wherein each of the voltage output mode and the power output mode further corresponds to one symbolic identifier configured to indicate the current output mode.

6. The method of claim 1, further comprising:
   detecting and determining by the first controller whether a smoking signal is input via the button if the button signals are not input for the first preset number of times; and
   generating a control signal by the first controller according to a detection signal from a second controller if the smoking signal is input.

7. The method of claim 6, wherein the first controller determines that the button input the smoking signal when the user presses the button once.

8. The method of claim 6, wherein the detection signal from the second controller comprises a voltage adjusting signal manually input by the user; after the first controller receives according to the voltage preset by the user.

9. The method of claim 6, wherein the detection signal from the second controller comprises a voltage sample signal for sampling a voltage of the battery; the second controller transforms the voltage sample signal to an actual battery voltage, and transmits the actual battery voltage to the first controller; the first controller determines whether the actual battery voltage is high enough to heat a coil which is configured to heat the liquid solution.

10. The method of claim 9, wherein if the first controller determines that the actual battery voltage is high enough to heat the coil, the first controller controls the LED corresponding to the current output mode to emit light with a breathing frequency to indicate a current power of the battery.

11. The method of claim 6, further comprising:
   detecting by the second controller whether the coil configured to heat the liquid solution breaks down; and
   stopping outputting by the first controller if the coil breaks down.

12. The method of claim 6, further comprising:
   determining by the first controller whether a time period for pressing the button is greater than a second preset time period during smoking; and
   stopping outputting by the first controller if the time period for pressing the button is greater than the second preset time period, and generating a warning signal by the first controller to warn the user.

13. The method of claim 1, further comprising:
   determining whether a USB connector of the electronic cigarette is connected to a charger after the system is powered on; and
   controlling the system to enter a charging state if the USB connector is connected to the charger.

* * * * *